United States Patent [19]

Strassel

[11] 4,291,099
[45] Sep. 22, 1981

[54] POLYVINYLIDENE FLUORIDE-POLYURETHANE LAMINATES AND METHOD

[75] Inventor: Albert Strassel, Oullins, France

[73] Assignee: Produits Chimiques Ugine Kuhlmann, Courbevoie, France

[21] Appl. No.: 112,957

[22] Filed: Jan. 17, 1980

Related U.S. Application Data

[62] Division of Ser. No. 3,633, Jan. 15, 1979, Pat. No. 4,221,757.

[30] Foreign Application Priority Data

Jan. 20, 1978 [FR] France .............................. 78 01590

[51] Int. Cl.³ ........................ B32B 27/00; B32B 31/00
[52] U.S. Cl. .................................... 428/421; 264/171; 264/237; 264/514; 428/423.1; 428/424.2; 428/424.6
[58] Field of Search .................... 428/44, 424.6, 424.2, 428/421, 423.1; 264/171, 173, 514, 237

[56] References Cited

U.S. PATENT DOCUMENTS

| | | | |
|---|---|---|---|
| 3,111,450 | 11/1963 | Stevens | 428/424.6 X |
| 3,805,848 | 4/1974 | Chrow | 428/424.6 X |
| 3,900,616 | 8/1975 | Moore | 428/424.6 X |
| 4,021,405 | 5/1977 | Tucker et al. | 428/421 X |
| 4,141,873 | 2/1979 | Dohany | 428/421 X |
| 4,215,177 | 7/1980 | Strassel | 428/424.6 X |

Primary Examiner—Thomas J. Herbert, Jr.
Attorney, Agent, or Firm—Sigalos & Levine

[57] ABSTRACT

The present invention relates to laminates of a polyvinylidene fluoride resin (hereinafter referred to as "PVF₂") and a thermoplastic polyurethane that are formed without the use of any intermediate bonding agent and to the method of making such laminates, preferably by co-extrusion, wherein the polyvinylidene fluoride resin must have a certain specified apparent viscosity, at 200° C., at certain specified velocity gradients.

4 Claims, 2 Drawing Figures

POLYVINYLIDENE FLUORIDE-POLYURETHANE LAMINATES AND METHOD

This is a division, of application Ser. No. 3,633, filed Jan. 15, 1979 now U.S. Pat. No. 4,221,757.

BACKGROUND OF THE INVENTION

The technique of coextrusion of at least two thermoplastic materials is well known and it is described, in particular, in POLYMER PLASTICS TECHNOLOGY AND ENGINEERING, Volume 3, pages 49 to 68: "Coextruded Films—Process and Properties" by John E. Guillotte.

Generally speaking, three methods of proceeding with the coextrusion of thermoplastic materials are known using conventional extruders whose number is equal to the number of polymers to be extruded. The first method consists of extruding the polymers separately and combining them as they exit the extrusion dies. The second method consists of feeding a single die by means of at least two extruders, with the die including as many passages as there are extruders and, consequently, polymers to be extruded. The streams of polymers meet at the level of the exit orifice of the die, thus perceptibly just prior to exiting from the latter. The third method consists of feeding a stream distributor by means of the desired number of extruders. In this distributor, the polymers combine into a single stream which is supplied to the die. In these processes, the respective flow rates of the extruders usually make it possible to control the relative thicknesses of the extruded polymers.

While numerous polymers can be thus coextruded, it has not been possible to satisfactorily combine $PVF_2$ with other polymers by these techniques. The reason, it is believed, is probably due to the lack of compatibility of the $PVF_2$ with the other polymers and to the well-known lack of adhesion between fluorine-containing resins and the majority of extrudable polymers, such as polyurethanes. In the past, the use of bonding agents has been required to adhere the $PVF_2$ to the polymers.

SUMMARY OF THE INVENTION

According to the present invention, it is now possible to obtain a laminate of $PVF_2$ and polyurethane, as by coextrusion, with the polymers adhering to one another without the need for an intermediary bonding agent.

Briefly stated, the present invention comprises a laminate comprising a layer of $PVF_2$ having adhered to at least one surface thereof a thermoplastic polyurethane, the $PVF_2$ possessing a certain specified specific viscosity and a thermoplastic polyurethane whose viscosity is preferably adapted to that of the $PVF_2$. The invention also comprises the method, preferably by extrusion, by which such laminates are formed as more specifically set forth below.

DETAILED DESCRIPTION

Figure 1:
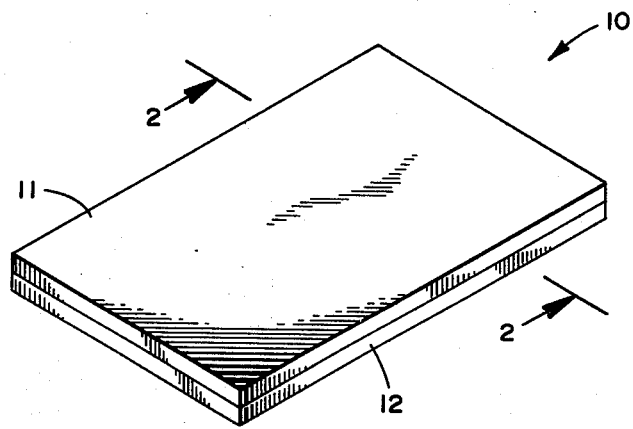
FIG. 1 is a perspective view of a laminate of the present invention.

As used in the present invention, the term "$PVF_2$" is meant to include not only the homopolymers thereof, but also copolymers containing at least 70% of $PVF_2$ by weight or mixtures of $PVF_2$ with other polymers. The essential condition is that these copolymers or mixtures possess the viscosity characteristics set forth below.

The thermoplastic polyurethanes which are laminated with the $PVF_2$ preferably are linear or only slightly cross-linked polyurethanes obtained, generally speaking, by the known and conventional reaction of an organic diisocyanate with a diol, polyether and/or polyester having a molecular weight falling between 500 and 6000, with the lengthening of the chains being caused by means of difunctional molecules, such as low-molecular-weight diols, diacids, diamines, water, or mixtures thereof, with or without the presence of a catalyst. Among the family of diols, polyethers or polyesters usually used for this type of reaction with diisocyanates, are the polyols, polyethers or polyesters copolymerized or grafted with acrylonitrile, acrylonitrile/styrene, methyl styrene, vinyl chloride, vinylidene chloride, or methyl methacrylate.

In practice, the present laminates of $PVF_2$ and polyurethane are characterized by the fact that they are obtained by bringing into intimate contact a layer of a $PVF_2$, which at 200° C. is found to be in such an apparent viscosity range that for at least two of the velocity gradients shown in the table below, it exhibits apparent viscosities respectively falling between the two extreme (minimum and maximum) apparent viscosity values indicated in the table, and a layer of a thermoplastic polyurethane.

| VELOCITY GRADIENT sec$^{-1}$ | APPARENT VISCOSITY VALUES in poise | |
|---|---|---|
| | minimum | maximum |
| 3.54 | $30 \times 10^3$ | $200 \times 10^3$ |
| 11.81 | $18 \times 10^3$ | $93 \times 10^3$ |
| 35.4 | $11 \times 10^3$ | $47 \times 10^3$ |
| 118 | $6.5 \times 10^3$ | $21 \times 10^3$ |
| 354 | $3.9 \times 10^3$ | $10 \times 10^3$ |
| 1181 | $2.3 \times 10^3$ | $4.5 \times 10^3$ |

The apparent viscosities shown above are measured in the known and conventional manner by means of a capillary rheometer, by taking into account Rabinowitch's correction as applied to non-Newtonian liquids.

In order to obtain the best possible adhesion between the $PVF^2$ and the polyurethane, the $PVF^2$ is preferably coextruded with a thermoplastic polyurethane preferably having an apparent viscosity at 200° C. which at the maximum is one-fourth that of the $PVF^2$ for the velocity gradients having served to define the $PVF^2$. In place of coextrusion it is possible to use other conventional types of procedures to bring the layers into intimate contact, such as blowing to form laminates. Blowing is effected by injecting gas into the interior of the extruded laminate while it is still hot for the purpose of increasing its volume or giving it a special shape.

The apparatus used for making the $PVF_2$/polyurethane laminates of the present invention can be any conventional or standard extruder, dies, or stream distributors conventionally employed for the coextrusion of thermoplastic polymers. As has already been pointed out, the thickness of each of the polymer layers depends on the regulation of the flow rate of each of the extruders. For the needs of the invention, the temperature of the die falls between 180° C. and 230° C., with the temperatures of the extruders being those usually provided in the case of the single extrusion of each of the polymers.

In order to ensure adhesion between the $PVF_2$ and the polyurethane, it is recommended that the coextrusion of these two polymers be carried out in such a way that the streams of each of the materials coming out of the extruders are combined at the latest at the outlet orifice of the die. It is more preferable that the streams of $PVF_2$ and of polyurethane, on leaving the extruder, travel along together and in contact for a certain length before reaching the exit orifice of the die. In that latter case, in place of a die having several ducts, a stream distributor is placed between the outlet of the extruders and a die having a single passage.

It is essential that the $PVF_2$ have the apparent viscosity discussed above since if it is either too fluid or too viscous in relation to the polyurethane, interpenetration of the polymers does not take place during coextrusion and, consequently, it is not possible to obtain laminates in which the polymer layers firmly adhere to each other.

As in the case of the customarily coextrudable polymers, it is possible to incorporate standard additives such as fillers, pigments, plasticizers, stabilizers and others into the $PVF_2$ and/or the polyurethane in their usual amounts and for their usual functions. It is likewise possible to incorporate various polymers or copolymers into the polyurethane, always provided, however, that the mixture contains at least 50% polyurethane by weight and keeps an apparent viscosity identical to the viscosity which the polyurethane should preferably have as a function of that of the $PVF_2$.

The $PVF_2$/polyurethane laminates obtained according to the instant method can be extruded in any and all forms that can be obtained by polymer coextrusion or like procedures. They can, for instance, be in the form of a film, plate, tube (pipe), section, sheath or container of any form whatever obtained by coextrusion/blowing. From the invention, the possibility likewise follows of combining other polymers with the composite material; in particular with the polyurethane, either during the course of coextrusion with the introduction of a third polymer or by any other means, as, for example, by adhesion using bonding agents.

The present invention will be further described in connection with the examples that follow. In all of the examples, viscosity measurements were carried out by means of a capillary rheometer, INSTRON Model 3211, with a capillary having a length of about 50.8 mm. (2 in.) for a nozzle diameter of about 1.27 mm. (0.05 in.).

EXAMPLE 1

The apparatus system used comprised two extruders (type SAMAFOR B.30) which had a screw length 20 times the diameter and a compression ratio of 3.5, and were arrayed in such a way that they supplied a stream distributor cylinder which itself was fixed to an ordinary flat die adapted to manufacture a plate 0.6 mm. thick and 300 mm. wide.

From the first extruder, a $PVF_2$ (FORAFLON 1 000 HD of the Produits Chimiques Ugine Kuhlmann Company) was extruded. At 200° C. it had an apparent viscosity of $75 \times 10^3$ and $18.4 \times 10^3$ poise, respectively, for velocity gradients, expressed in $\sec^{-1}$, of 11.8 and 118.

The heating temperatures posted for this extruder were 180° C. at the entrance, 200° C. for the first body and 200° C. for the second body.

From the second machine, a thermoplastic polyurethane (ESTANE 58271) was extruded. At 200° C. it had an apparent viscosity of $2.5 \times 10^3$ and $1.2 \times 10^3$ poise, respectively, for velocity gradients, expressed in $\sec^{-1}$, of 11.8 and 118. The heating temperatures posted for this extruder were, starting from the entrance: 150° C., 160° C., and 180° C.

The die and the stream distributor were kept at 200° C.

The flow rates (outputs) of the two machines were regulated in such a way that the film which was obtained had a thickness of about 150 microns for the $PVF_2$ and 350 microns for the polyurethane.

The extruded film was received between the cylinders of a calender which were heated to 120° C.

Figure 2:
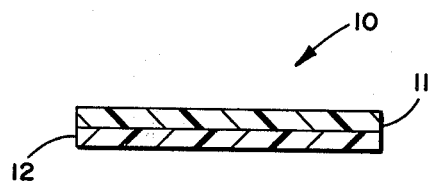
FIG. 2 is a sectional view taken along line 2—2 of FIG. 1.

The $PVF_2$/polyurethane laminate film were obtained whose two layers were inseparable; firmly bonded together. Such a film is depicted in FIGS. 1 and 2 wherein it is shown that the film 10 consists of the polyvinylidene fluoride layer 11 and the polyurethane 12.

EXAMPLE 2

The apparatus of EXAMPLE 1 was used except that the extruders supplied a stream distributor fixed to a die shaped for the manufacture of a pipe. A standard jig of the "internal" type, which is slightly conical (tapered) and cooled by water circulation, is attached to the die.

The same $PVF_2$ as of EXAMPLE 1 was extruded under the same conditions from the first extruder.

From the second extruder, a mixture was extruded which had been obtained by the regranulation of 35 parts by weight of a copolymer which was basically polyethylene and acrylic acid, and of 65 parts by weight of the polyurethane of EXAMPLE 1. For an apparent viscosity of the $PVF_2$ at 200° C. of $141 \times 10^3$ and $8.8 \times 10^3$ poise, respectively, for velocity gradients expressed in $\sec^{-1}$, of 3.5 and 354, the apparent viscosity of the mixture which is based on polyurethane at 200° C., respectively, amounted to $9.2 \times 10^3$ and $1.9 \times 10^3$ for these same velocity gradients expressed in $\sec^{-1}$. The heating temperatures posted for this extruder were, by starting from the entrance: 170° C., 180° C., and 190° C.

The die and the stream distributor were kept at 200°–210° C.

A $PVF_2$/polyurethane laminate pipe was obtained, which was composed of two perfectly adhering layers of 0.5 mm. thickness each.

EXAMPLE 3

The method and apparatus of EXAMPLE 2 were used except that a third extruder, identical to the preceding ones and supplied with polyethylene (LOTREN 300'), was added at the stream distributor. The posted heating temperatures for the third extruder were, starting from the entrance: 180° C., 190° C., and 200° C.

A laminate pipe was obtained, which was composed of three layers appearing in the following order: $PVF_2$, mixture which is basically polyurethane, and polyethylene. These layers of polymer adhere perfectly to one another.

EXAMPLE 4

Two extruders (SAMAFOR), one having a diameter of 90 mm., and the other a diameter of 65 mm. were used to directly supply a coextrusion die.

From the extruder having a diameter of 65, a thermoplastic polyurethane (DESMOPAN 488) was extruded, which at 200° C. had an apparent viscosity of $3.2 \times 10^3$ and $0.8 \times 10^3$ poise, respectively, for velocity gradients, expressed in $sec^{-1}$ of 35.4 and 1181. The posted heating temperatures were starting from the entrance: 170° C., 180° C., and 190° C.

From the extruder having a diameter of 90, a $PVF_2$ (FORAFLON 4 000 HD of the Produits Chimiques Ugine Kuhlmann Company) was extruded. At 200° C., this $PVF_2$ had an apparent viscosity of $21.2 \times 10^3$ and $2.4 \times 10^3$ poise, respectively, for velocity gradients, expressed in $sec^{-1}$, of 35.4 and 1181. The posted heating temperatures were starting from the entrance: 180° C., 190° C., and 200° C.

The coextrusion die which was 1, 300 mm. wide is maintained at 210° C.

The two streams of polymer combined just when coming out of the die, at the internal level of the exit orifice of said die, so as to form a film which was received between the cylinders of a calender, which had been heated to 130° C. A film was obtained which had a thickness of 8/10 mm. and was composed of two perfectly adhering layers of equal thickness.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A laminate comprising a layer of a polyvinylidene fluoride resin having adhered to at least one surface thereof without any intermediate bonding agent, a layer of a thermoplastic polyurethane resin, said laminate being formed by bringing into contact at least one fluid stream of each of said resins while said stream of a polyvinylidene fluoride has, at 200° C., an apparent viscosity, in poises, between the minimum and maximum values set forth below for at least two of the velocity gradients, in $sec^{-1}$, set forth below:

| VELOCITY GRADIENT | APPARENT VISCOSITY VALUES | |
|---|---|---|
| | Minimum | Maximum |
| 3.54 | $30 \times 10^3$ | $200 \times 10^3$ |
| 11.81 | $18 \times 10^3$ | $93 \times 10^3$ |
| 35.4 | $11 \times 10^3$ | $47 \times 10^3$ |
| 118 | $6.5 \times 10^3$ | $21 \times 10^3$ |
| 354 | $3.9 \times 10^3$ | $10 \times 10^3$ |
| 1181 | $2.3 \times 10^3$ | $4.5 \times 10^3$ |

2. The laminate according to claim 1 wherein the said thermoplastic polyurethane resin has an apparent viscosity, at 200° C., which at the maximum is one-fourth as large as that of said polyvinylidene fluoride resin for the same at least two velocity gradients used to define said polyvinylidene fluoride resin.

3. The laminate according to claims 1 or 2 including at least one additional layer of resin adhered to said polyvinylidene fluoride resin layer or said thermoplastic polyurethane resin layer.

4. The laminate according to claim 1 or 2 wherein said polyvinylidene fluoride resin is selected from homopolymers of polyvinylidene fluoride copolymers containing at least 70% by weight of polyvinylidene fluoride, or mixtures of polyvinylidene fluoride with other polymers and said thermoplastic polyurethane is selected from linear or only slightly cross-linked polyurethanes.

* * * * *